United States Patent
Sangiamwong et al.

(10) Patent No.: US 8,743,780 B2
(45) Date of Patent: Jun. 3, 2014

(54) RADIO COMMUNICATION SYSTEM, RADIO TRANSMITTING APPARATUS AND RADIO RECEIVING APPARATUS

(75) Inventors: Jaturong Sangiamwong, Kanagawa (JP); Takahiro Asai, Kanagawa (JP); Yukihiko Okumura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 559 days.

(21) Appl. No.: 12/899,606

(22) Filed: Oct. 7, 2010

(65) Prior Publication Data

US 2011/0085500 A1  Apr. 14, 2011

(30) Foreign Application Priority Data

Oct. 8, 2009  (JP) ................. 2009-234503

(51) Int. Cl.
*H04W 40/00* (2009.01)
*H04W 72/00* (2009.01)

(52) U.S. Cl.
CPC .................. *H04W 72/005* (2013.01)
USPC ...................................................... 370/328

(58) Field of Classification Search
None
See application file for complete search history.

(56) References Cited

U.S. PATENT DOCUMENTS

| | | |
|---|---|---|
| 2006/0200722 A1 | 9/2006 | Braun |
| 2009/0168711 A1* | 7/2009 | Fukuoka et al. ............... 370/329 |
| 2009/0307559 A1* | 12/2009 | Wu et al. ........................ 714/749 |
| 2011/0194518 A1* | 8/2011 | Wu ................................ 370/329 |

FOREIGN PATENT DOCUMENTS

| | | |
|---|---|---|
| CN | 1422032 A | 6/2003 |
| JP | 2004253828 A | 9/2004 |
| WO | 03/103200 A1 | 11/2003 |
| WO | 2010046956 A1 | 4/2010 |

OTHER PUBLICATIONS

European Patent Application No. 10186514.5; EP Search Report dated Nov. 15, 2011.
Office Action with English Translation, Mailing Date—Sep. 6, 2011, issued in conjunction with JP Patent Application No. 2009-234503.
First Notification of Office Action issued in corresponding Chinese Application No. 201010501266.6 mailed on Dec. 5, 2012.

* cited by examiner

*Primary Examiner* — Huy D Vu
*Assistant Examiner* — Bao G Nguyen
(74) *Attorney, Agent, or Firm* — MKG, LLC

(57) ABSTRACT

The present invention is a radio communication system in which a radio transmitting apparatus transmits a packet to a radio receiving apparatus using a HARQ scheme, including a moving speed acquiring unit configured to acquire a moving speed of a radio communication terminal which is the radio transmitting apparatus or the radio receiving apparatus, a selection unit configured to select a transmission method of an information bit and an error correction bit which are transmitted under the HARQ scheme based on the moving speed acquired by the moving speed acquiring unit, and a transmitting unit configured to perform initial transmission and retransmission of the packet according to the transmission method selected by the selection unit.

3 Claims, 11 Drawing Sheets

RADIO COMMUNICATION SYSTEM, RADIO TRANSMITTING APPARATUS AND RADIO RECEIVING APPARATUS

CROSS REFERENCE TO RELATED APPLICATION

This application is based upon and claims the benefit of priority from the prior Japanese Patent Application No. 2009-234503, filed on Oct. 8, 2009; the entire contents of which are incorporated herein by reference.

BACKGROUND OF THE INVENTION

1. Field of the Invention

The present invention relates to a radio communication system in which a radio transmitting apparatus transmits a packet to a radio receiving apparatus using a hybrid automatic repeat request (HARQ) scheme, the radio transmitting apparatus and the radio receiving apparatus.

2. Description of the Related Art

There is conventionally known a radio communication system that performs packet retransmission control using a hybrid automatic repeat request (HARQ) scheme (e.g., P. Frenger, S. Parkvall, and E. Dahlman, "Performance comparison of HARQ with Chase combining and incremental redundancy for HSDPA," Proc. VTC2001-Fall, October 2001). This HARQ scheme uses HARQ-IR (Incremental Redundancy) mode and HARQ-CC (Chase Combining) mode as predominant operating modes.

In the HARQ-CC mode, a radio transmitting apparatus transmits the same packet including an information bit and an error correction bit at both initial transmission and retransmission. To be more specific, as shown in FIG. 1A, the radio transmitting apparatus transmits a packet including a systematic bit S which is an information bit and a parity bit P1 which is an error correction bit to the radio receiving apparatus at initial transmission and transmits, at retransmission, completely the same packet transmitted at initial transmission. The radio receiving apparatus symbol-combines the packet received at initial transmission with the packet received at retransmission and thereby improves SINR (Signal-to-Interference-plus-Noise Ratio).

On the other hand, in the HARQ-IR mode, the radio transmitting apparatus transmits a packet including an information bit at initial transmission and transmits a packet including an error correction bit at retransmission. To be more specific, as shown in FIG. 1B, the radio transmitting apparatus transmits a packet including only a systematic bit S which is an information bit at initial transmission and transmits a packet including only a parity bit P1 or P2 which is an error correction bit at retransmission. The radio receiving apparatus improves the coding gain by correcting errors of the systematic bit S received at initial transmission using the parity bit P1 or P2 received at retransmission.

Furthermore, there is also known a radio communication system that improves a throughput of the entire system by adaptively selecting an operating mode under the above described HARQ scheme.

For example, US Patent Application Publication No. 2006/0200722 describes a radio communication system that selects a HARQ operating mode based on a HARQ buffer size minimum required for HARQ processing in a radio receiving apparatus. Compared to the HARQ-CC mode, the HARQ-IR mode generally has more complicated HARQ processing in the radio receiving apparatus and has a larger necessary HARQ buffer size. Thus, when the HARQ buffer size required for the HARQ-IR mode does not exceed the HARQ buffer size of the radio receiving apparatus, the radio communication system of US Patent Application Publication No. 2006/0200722 applies the HARQ-IR mode. On the other hand, when the HARQ buffer size required for the HARQ-IR mode exceeds the HARQ buffer size of the radio receiving apparatus and the HARQ buffer size required for the HARQ-CC mode does not exceed the HARQ buffer size of the radio receiving apparatus, the radio communication system applies the HARQ-CC mode.

Furthermore, Japanese Patent Application Laid-Open No. 2004-253828 describes a radio communication system that selects a HARQ operating mode based on channel quality at initial transmission. To be more specific, the radio communication system of Japanese Patent Application Laid-Open No. 2004-253828 selects the HARQ-IR mode when the channel quality at initial transmission is better than a predetermined threshold and selects the HARQ-CC mode when the channel quality at initial transmission is poorer than the predetermined threshold.

However, the radio communication system of US Patent Application Publication No. 2006/0200722 or Japanese Patent Application Laid-Open No. 2004-253828 may not be able to select an appropriate HARQ operating mode and has a problem that its effect of improving the throughput of the entire system is low.

To be more specific, in the radio communication system of US Patent Application Publication No. 2006/0200722, if a sufficiently large HARQ buffer size is provided for the radio receiving apparatus, the HARQ-CC mode is not selected but only the HARQ-IR mode is selected. With the development of hardware in recent years, a large size HARQ buffer is easily available, and so the HARQ buffer size is not very important. Therefore, in the radio communication system of US Patent Application Publication No. 2006/0200722, the HARQ-IR mode is selected even in the case where the HARQ-CC mode is preferred, thus the effect of improving the throughput of the entire system is low.

Furthermore, in the radio communication system of Japanese Patent Application Laid-Open No. 2004-253828, when channel quality at initial transmission is good, the HARQ-IR mode is selected according to channel quality at initial transmission even if the channel quality at retransmission is poor. However, in such a case, since the effect of improving the coding gain by using the parity bit received at retransmission cannot be expected, the effect of improving the coding gain by applying the HARQ-IR mode is small. Furthermore, since signal processing in the HARQ-IR mode is complicated, the HARQ-CC mode is preferably used instead of the HARQ-IR mode in the above described case.

Furthermore, in the radio communication system of Japanese Patent Application Laid-Open No. 2004-253828, when channel quality is poor not only at initial transmission but also at retransmission, the HARQ-CC mode is selected according to the channel quality at initial transmission. However, in such a case, a coding gain in the HARQ-IR mode can be more expected compared to the effect of improving the SINR in the HARQ-CC mode. Thus, in the above described case, it is preferable to apply the HARQ-IR mode instead of the HARQ-CC mode.

Thus, since the radio communication system of Japanese Patent Application Laid-Open No. 2004-253828 does not take a fluctuation in channel quality at initial transmission and at retransmission into consideration, it is not possible to select an appropriate HARQ operating mode and the effect of improving the throughput of the entire system is low.

SUMMARY OF THE INVENTION

The present invention has been implemented in view of the above described problems and it is an object of the present invention to provide a radio communication system, radio transmitting apparatus and radio receiving apparatus capable of selecting an appropriate HARQ operating mode in consideration of a fluctuation in channel quality at initial transmission and at retransmission without increasing processing loads in the radio transmitting apparatus and radio receiving apparatus.

The radio communication system according to the present invention is a radio communication system in which a radio transmitting apparatus transmits a packet to a radio receiving apparatus using a hybrid automatic repeat request (HARQ) scheme, including a moving speed acquiring unit configured to acquire a moving speed of a radio communication terminal which is the radio transmitting apparatus or the radio receiving apparatus, a selection unit configured to select a transmission method of an information bit and an error correction bit which are transmitted under the HARQ scheme based on the moving speed acquired by the moving speed acquiring unit, and a transmitting unit configured to perform initial transmission and retransmission of the packet according to the transmission method selected by the selection unit.

According to this configuration, a transmission method of an information bit and an error correction bit which are transmitted under the HARQ scheme is selected based on the moving speed of the radio communication terminal. Therefore, it is possible to determine a fluctuation in channel quality at initial transmission and at retransmission based on the moving speed of the radio communication terminal, and simply select an appropriate transmission method of the information bit and error correction bit which are transmitted under the HARQ scheme, without increasing processing load in the radio transmitting apparatus and the radio receiving apparatus.

Furthermore, in the above described radio communication system of the present invention, when the moving speed acquired by the moving speed acquiring unit is equal to or below a first threshold, the selection unit may be configured to select a first transmission method that transmits a packet including the information bit at initial transmission and transmits a packet including the error correction bit at retransmission, whereas when the moving speed acquired by the moving speed acquiring unit is greater than the first threshold, the selection unit may be configured to select a second transmission method that transmits the same packet including the information bit and the error correction bit at both initial transmission and retransmission.

Furthermore, the above described radio communication system of the present invention further includes a channel quality measuring unit configured to measure channel quality between the radio transmitting apparatus and the radio receiving apparatus at a retransmission interval which is a time interval with which the packet is retransmitted, wherein the moving speed acquiring unit may be configured to acquire the moving speed at a time interval longer than the retransmission interval, and the selection unit may be configured to select the transmission method based on a fluctuation value of the channel quality measured by the channel quality measuring unit in addition to the moving speed acquired by the moving speed acquiring unit.

Furthermore, in the above described radio communication system of the present invention, when the moving speed acquired by the moving speed acquiring unit is equal to or below a first threshold, the selection unit may be configured to select a first transmission method that transmits a packet including the information bit at initial transmission and transmits a packet including the error correction bit at retransmission, whereas when the moving speed acquired by the moving speed acquiring unit is greater than the first threshold and the fluctuation value of channel quality is equal to or below a second threshold, the selection unit may be configured to select the first transmission method, and when the moving speed acquired by the moving speed acquiring unit is greater than the first threshold and the fluctuation value of channel quality is greater than the second threshold, the selection unit may be configured to select the second transmission method that transmits the same packet including the information bit and the error correction bit at both initial transmission and retransmission.

The radio transmitting apparatus of the present invention is a radio transmitting apparatus that transmits a packet to a radio receiving apparatus using an hybrid automatic repeat request (HARQ) scheme, including a moving speed acquiring unit configured to acquire a moving speed of a radio communication terminal which is the radio transmitting apparatus or the radio receiving apparatus, a selection unit configured to select a transmission method of an information bit and an error correction bit which are transmitted under the HARQ scheme based on the moving speed acquired by the moving speed acquiring unit, and a transmitting unit configured to perform initial transmission and retransmission of the packet according to the transmission method selected by the selection unit.

The radio receiving apparatus of the present invention is a radio receiving apparatus that receives a packet transmitted from a radio transmitting apparatus using an hybrid automatic repeat request (HARQ) scheme, including a moving speed acquiring unit configured to acquire a moving speed of a radio communication terminal which is the radio transmitting apparatus or the radio receiving apparatus, a selection unit configured to select a transmission method of an information bit and an error correction bit which are transmitted under the HARQ scheme based on the moving speed acquired by the moving speed acquiring unit, and a notification unit configured to notify the transmission method selected by the selection unit to the radio transmitting apparatus.

According to the present invention, it is possible to provide a radio communication system, radio transmitting apparatus and radio receiving apparatus capable of selecting an appropriate HARQ operating mode in consideration of a fluctuation in channel quality at initial transmission and at retransmission without increasing processing load in the radio transmitting apparatus and the radio receiving apparatus.

DETAILED DESCRIPTION OF THE INVENTION

Figure 1A:
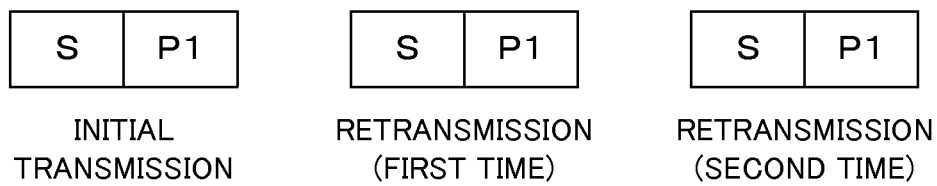
FIG. 1A is a diagram illustrating a HARQ operating mode.

Hereinafter, embodiments of the present invention will be described. In the following descriptions of drawings, identical or similar parts will be assigned identical or similar reference numerals.

First Embodiment

Figure 2:
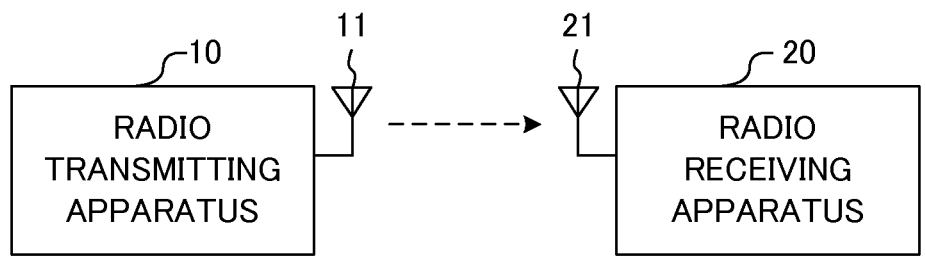
FIG. 2 is a schematic configuration diagram of a radio communication system according to a first embodiment of the present invention.

FIG. 2 is a configuration diagram of a radio communication system according to a first embodiment. As shown in FIG. 2, the radio communication system includes a radio transmitting apparatus 10 and a radio receiving apparatus 20. In the radio communication system shown in FIG. 2, the radio transmitting apparatus 10 transmits a packet to the radio receiving apparatus 20 using a hybrid automatic repeat request (HARQ) scheme.

Furthermore, the radio transmitting apparatus 10 performs initial transmission and retransmission of the packet to the radio receiving apparatus 20 according to the operating mode (transmission method of an information bit and error correction bit) used in the HARQ scheme. To be more specific, the radio transmitting apparatus 10 performs initial transmission and retransmission of the packet to the radio receiving apparatus 20 in a HARQ-CC mode (second transmission method) in which the same packet including an information bit and an error correction bit is transmitted at both initial transmission and retransmission or a HARQ-IR mode (first transmission method) in which a packet including an information bit is transmitted at initial transmission and a packet including an error correction bit is transmitted at retransmission.

Here, the radio transmitting apparatus 10 means a radio base station that transmits a packet to a radio communication terminal in a downlink and means a radio communication terminal that transmits a packet to the radio base station in an uplink. Furthermore, the radio receiving apparatus 20 means a radio communication terminal that receives a packet from the radio base station in a downlink and means the radio base station that receives a packet from the radio communication terminal in an uplink.

The number of radio transmitting apparatuses 10 and the number of radio receiving apparatuses 20 are not limited to the numbers shown in FIG. 2. For example, a plurality of radio transmitting apparatuses 10 (radio base stations) can perform retransmission control on packets with one or more radio receiving apparatuses 20 (radio communication terminals) in a downlink and a plurality of radio transmitting apparatuses 10 (radio communication terminals) can transmit packets to one or more radio receiving apparatuses 20 (radio base stations) in an uplink. Furthermore, the number of antennas 11 of the radio transmitting apparatus 10 and the number of antennas 21 of the radio receiving apparatus 20 are not limited to the numbers shown in FIG. 2. When a plurality of antennas 11 and a plurality of antennas 21 are provided, MIMO-based communication may be performed between the radio transmitting apparatus 10 and the radio receiving apparatus.

Next, a functional configuration of the radio communication system according to the first embodiment will be described. To be more specific, the functional configurations of the radio transmitting apparatus 10 and radio receiving apparatus 20 included in the radio communication system will be described with reference to FIGS. 3 to 5.

Figure 3:
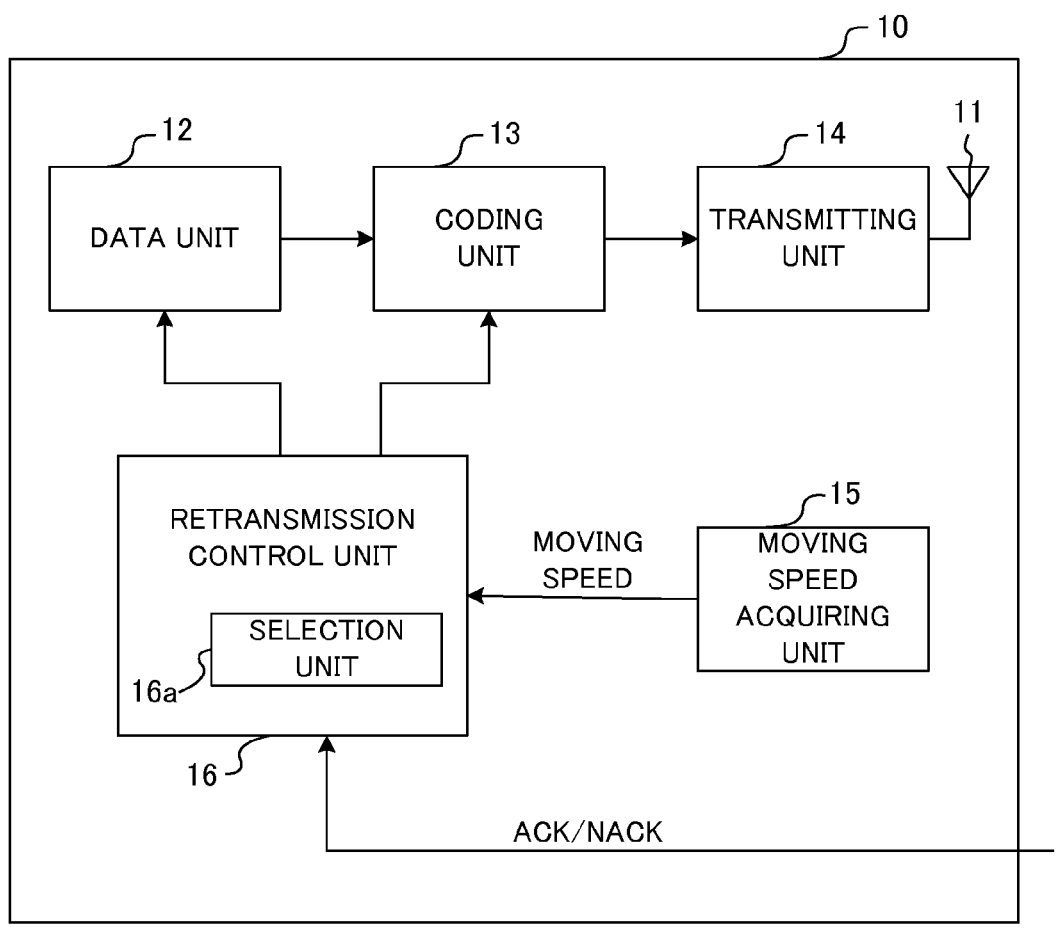
FIG. 3 is a functional configuration diagram of the radio transmitting apparatus according to the first embodiment of the present invention.

FIG. 3 is a functional configuration diagram of the radio transmitting apparatus according to the first embodiment. As shown in FIG. 3, the radio transmitting apparatus 10 is provided with an antenna 11, a data unit 12, a coding unit 13, a transmitting unit 14, a moving speed acquiring unit 15, and a retransmission control unit 16.

The data unit 12 generates data to be transmitted as an initial transmission packet or retransmission packet. The data is an information bit of user traffic data or the like. Furthermore, the data unit 12 provides the generated data to the coding unit 13, according to a notification from the retransmission control unit 16 which will be described later. To be more specific, when it is notified from the retransmission control unit 16 that packet retransmission is unnecessary, the data unit 12 provides new data for initial transmission to the coding unit 13. On the other hand, when it is notified from the retransmission control unit 16 that packet retransmission is necessary, the data unit 12 provides data for retransmission to the coding unit 13.

The coding unit 13 performs channel coding processing and modulation processing on the data provided from the data unit 12. To be more specific, the coding unit 13 generates a systematic bit S which is data (information bit) itself provided from the data unit 12 and a parity bit P which is an error correction bit. Here, the parity bit P is obtained by coding the data provided from the data unit 12.

Furthermore, the coding unit 13 generates a transmission packet according to a HARQ operating mode notified from the retransmission control unit 16, based on the systematic bit S and parity bit P generated. To be more specific, when a HARQ-CC mode is notified from the retransmission control unit 16, the coding unit 13 generates a transmission packet including the systematic bit S and parity bit P. For example, as shown in FIG. 1A, the coding unit 13 generates a transmission packet including the systematic bit S and parity bit P1 at initial transmission. Furthermore, at first and second retransmissions, the coding unit 13 also generates the transmission packet including at least the systematic bit S and parity bit P1 which is same as that at initial transmission.

Figure 1B:
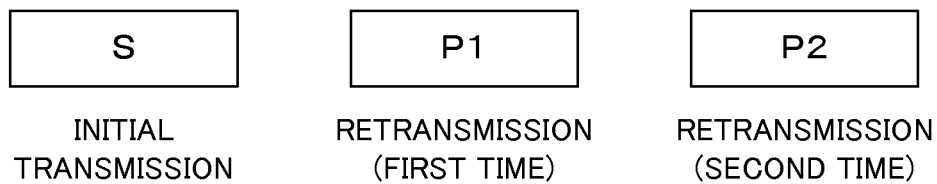
FIG. 1B is a diagram illustrating a HARQ operating mode.

On the other hand, when a HARQ-IR mode is notified from the retransmission control unit 16, the coding unit 13 generates a transmission packet including a systematic bit S or parity bit P. For example, as shown in FIG. 1B, the coding unit 13 generates a transmission packet including only a systematic bit S at initial transmission. Furthermore, the coding unit 13 generates a transmission packet including only a parity bit P1 at first retransmission and generates a transmission packet including only a parity bit P2 at second retransmission.

Furthermore, the coding unit 13 performs modulation processing on the transmission packet generated and provides the signal to the transmitting unit 14. The transmitting unit 14 multiplexes the signal provided from the coding unit 13, a pilot signal and a control signal (not shown) (information necessary for demodulation of the data signal, synchronization signal, broadcast signal or the like) and transmits the multiplexed signal from the antenna 11.

For the above described channel coding processing and modulation processing, an AMC (Adaptive Modulation and channel Coding) scheme may be used. In this case, the channel coding rate and data modulation scheme are adaptively changed based on, for example, channel quality (expressed by CQI or the like) notified from the radio receiving apparatus 20.

The moving speed acquiring unit 15 acquires a moving speed of the radio communication terminal and notifies the moving speed to the retransmission control unit 16. To be more specific, the moving speed acquiring unit 15 acquires the moving speed of the radio communication terminal which is the radio receiving apparatus 20 in the downlink at a predetermined time interval and acquires the moving speed of the radio communication terminal which is the radio transmitting apparatus 10 in the uplink at a predetermined time interval.

Figure 4:
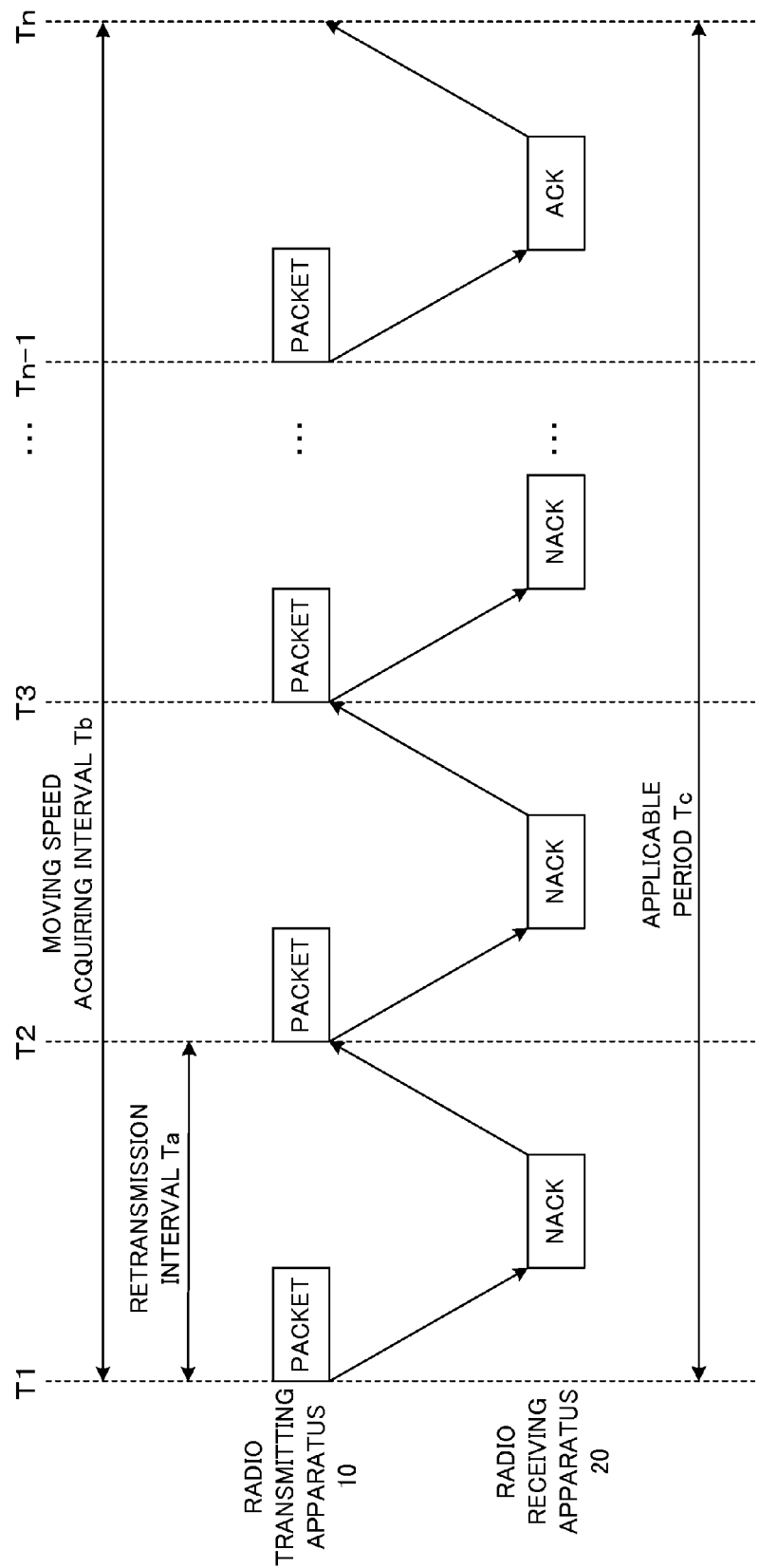
FIG. 4 is a diagram illustrating retransmission control according to the first embodiment of the present invention.

Here, the "predetermined time interval" refers to a time interval (e.g., several seconds) longer than a packet retransmission interval Ta (e.g., several milliseconds) from the radio transmitting apparatus 10 to the radio receiving apparatus 20. For example, as shown in FIG. 4, the moving speed acquiring unit 15 acquires the moving speed of the radio communication terminal at a moving speed acquiring interval Tb which is a time interval longer than a retransmission interval Ta.

Furthermore, the moving speed of the radio communication terminal is calculated based on position information periodically measured by, for example, a GPS (Global Positioning System) function provided for the radio communication terminal. In this case, the moving speed acquiring unit 15 may acquire the moving speed calculated by the radio receiving apparatus 20 (radio communication terminal) in the downlink or the moving speed may be calculated based on the position information acquired from the radio receiving apparatus 20 (radio communication terminal). Furthermore, the moving speed acquiring unit 15 calculates the moving speed based on position information periodically measured by the GPS function of the radio transmitting apparatus 10 (radio communication terminal) in the uplink.

The retransmission control unit 16 performs packet retransmission control based on an acknowledgment signal (ACK/NACK) notified from the radio receiving apparatus 20 and the moving speed of the radio communication terminal acquired by the moving speed acquiring unit 15. Here, the "acknowledgment signal" indicates an error detection result of received data at the radio receiving apparatus 20. When there is no error in the received data, an acknowledgment (ACK) is notified from the radio receiving apparatus 20 to the radio transmitting apparatus 10, and when there is an error in the received data, a negative acknowledgment (NACK) is notified from the radio receiving apparatus 20 to the radio transmitting apparatus 10.

Upon receiving a notification of an acknowledgment (ACK) from the radio receiving apparatus 20, the retransmission control unit 16 notifies to the data unit 12 that packet retransmission is unnecessary. On the other hand, upon receiving a notification of a negative acknowledgment (NACK) from the radio receiving apparatus 20, the retransmission control unit 16 notifies to the data unit 12 that packet retransmission is necessary.

Furthermore, the retransmission control unit 16 includes a selection unit 16a. The selection unit 16a selects a HARQ operating mode based on the moving speed of the radio communication terminal notified from the moving speed acquiring unit 15 and notifies the selected HARQ operating mode to the coding unit 13. To be more specific, when the moving speed acquired by the moving speed acquiring unit 15 is equal to or below a threshold Th1 (first threshold), the selection unit 16a selects the HARQ-IR mode. On the other hand, when the moving speed acquired by the moving speed acquiring unit 15 is greater than the threshold Th1, the selection unit 16a selects the HARQ-CC mode. Here, the threshold Th1 is calculated based on a carrier frequency and retransmission time interval. The threshold Th1 decreases as the carrier frequency or retransmission time interval increases.

Figure 5:
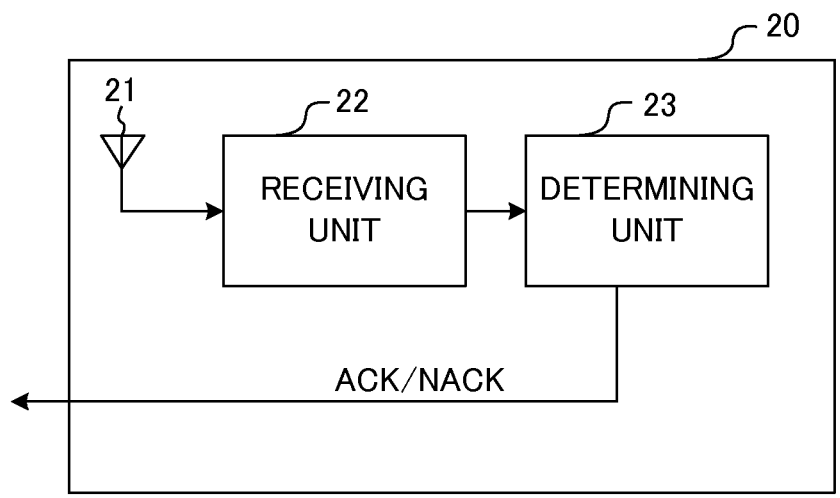
FIG. 5 is a functional configuration diagram of the radio receiving apparatus according to the first embodiment of the present invention.

FIG. 5 is a functional configuration diagram of the radio receiving apparatus according to the first embodiment. As shown in FIG. 5, the radio receiving apparatus 20 is provided with an antenna 21, a receiving unit 22 and a determining unit 23. The receiving unit 22 performs demodulation processing on a signal received from the radio transmitting apparatus 10 and converts the received signal to received data.

The determining unit 23 performs error detection processing on the received data. The determining unit 23 notifies an acknowledgment signal (ACK/NACK) indicating an error detection result to the radio transmitting apparatus 10.

Figure 6:
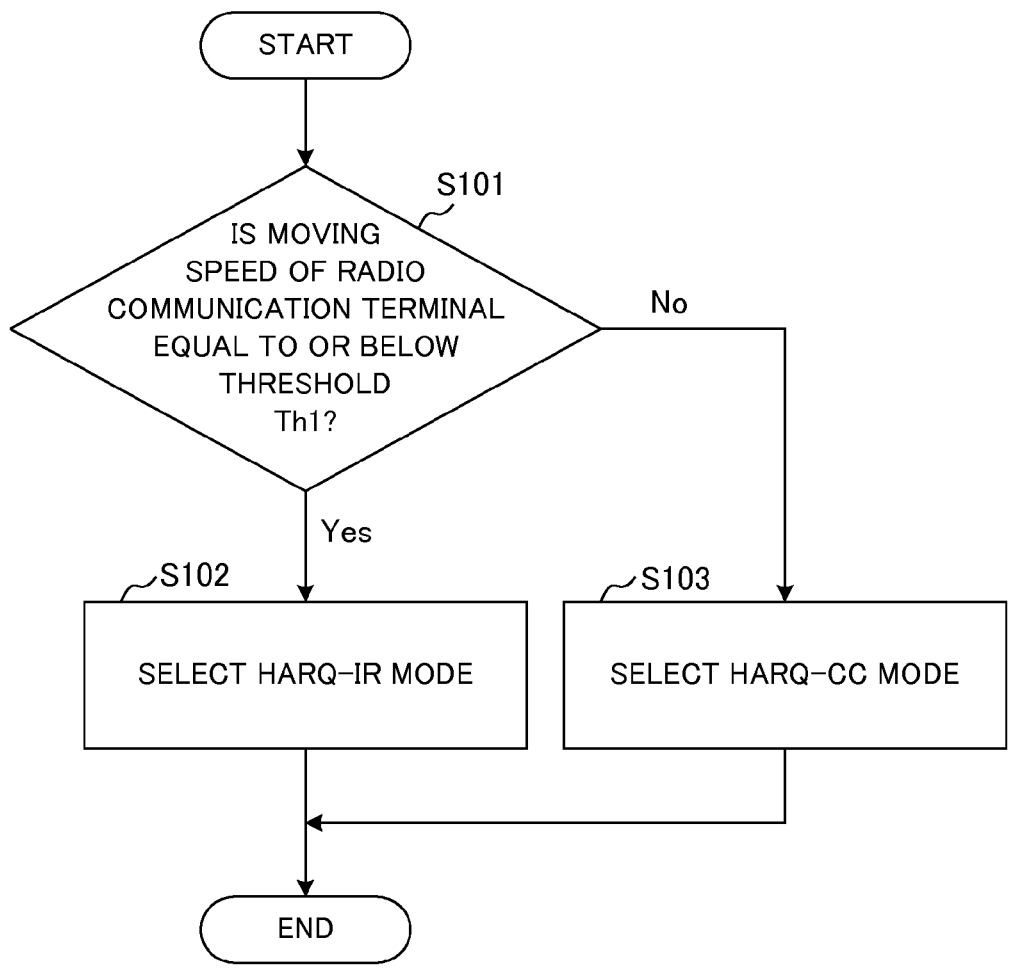
FIG. 6 is a flowchart illustrating operation of the radio communication system according to the first embodiment of the present invention.

Next, in the radio communication system configured as shown above, the operation of the radio transmitting apparatus 10 selecting the HARQ operating mode will be described. FIG. 6 is a flowchart illustrating a selection operation of the HARQ operating mode according to the first embodiment. Suppose this operation is started every time the moving speed of the radio communication terminal is acquired, that is, at the moving speed acquiring interval Tb shown in FIG. 4.

The selection unit 16a determines whether or not the moving speed of the radio communication terminal is equal to or below the threshold Th1 (step S101).

When the moving speed of the radio communication terminal is equal to or below the threshold Th1 (step S101: Yes), the selection unit 16a selects the HARQ-IR mode (step S102). Here, when the moving speed of the radio communication terminal is equal to or below the threshold Th1, the fluctuation in channel quality at initial transmission and at retransmission is small and the channel quality at initial transmission is estimated to be substantially equal to that at retransmission.

For example, in FIG. 4, when the moving speed of the radio communication terminal at time T1 is equal to or below the threshold Th1, the channel quality at time T1 (at initial transmission) is estimated to be substantially equal to the channel quality at time T2 to Tn (at retransmission). In this case, a coding gain in the HARQ-IR mode can be more expected compared to an SINR improvement effect in the HARQ-CC mode. Therefore, when the moving speed of the radio communication terminal at time T1 is equal to or below the threshold Th1, the selection unit 16a selects the HARQ-IR mode as the HARQ operating mode applicable to time T1 to Tn (applicable period Tc).

On the other hand, when the moving speed of the radio communication terminal is greater than the threshold Th1 (step S101: No), the selection unit 16a selects the HARQ-CC mode (step S103). Here, when the moving speed of the radio communication terminal is greater than the threshold Th1, the fluctuation in channel quality at initial transmission and at retransmission is drastic and the channel quality is estimated to considerably differ at initial transmission and at retransmission.

For example, in FIG. 4, when the moving speed of the radio communication terminal at time T1 is greater than the threshold Th1, the channel quality at time T1 (at initial transmission) is estimated to be significantly different from the channel quality at time T2 to Tn (at retransmission). When the channel quality at time T2 to Tn is significantly better than the channel quality at time T1, the SINR improvement effect in the HARQ-CC mode can be more expected compared to the coding gain in the HARQ-IR mode. Furthermore, when the channel quality at time T2 to Tn is significantly poorer than the channel quality at time T1, the effect of utilizing the retransmission packet can be expected in neither the HARQ-IR mode nor the HARQ-CC mode, and therefore selecting the HARQ-CC mode with simpler signal processing is preferable to the HARQ-IR mode. Therefore, when the moving speed of the radio communication terminal at time T1 is greater than the threshold Th1, the selection unit 16a selects the HARQ-CC mode as the HARQ operating mode applicable to time T1 to Tn (applicable period Tc).

According to the radio communication system according to the first embodiment, an operating mode (transmission method of an information bit and an error correction bit) used in the HARQ scheme is selected based on the moving speed of the radio communication terminal. Therefore, it is possible to estimate a fluctuation in channel quality at initial transmission and at retransmission based on the moving speed of the radio communication terminal, and simply to select an appropriate operating mode without increasing processing loads in the radio transmitting apparatus and the radio receiving apparatus.

Here, when the fluctuation in channel quality at initial transmission and at retransmission is actually calculated based on the channel quality measured at the retransmission interval Ta which is an interval of several milliseconds, processing loads in the radio transmitting apparatus and radio receiving apparatus increase accompanying the calculation processing and the operating mode selection processing at an interval of several milliseconds. Furthermore, many radio frequency resources are consumed accompanying the notifications of calculation results at an interval of several milliseconds. According to the radio communication system of the first embodiment, based on the moving speed of the radio communication terminal acquired at the moving speed acquiring interval Tb for several seconds, it is possible to estimate a fluctuation in channel quality in the several seconds, and it is thereby possible to select an appropriate operating mode without increasing processing loads in the radio transmitting apparatus and the radio receiving apparatus.

Furthermore, according to the radio communication system according to the first embodiment, when the moving speed of the radio communication terminal is equal to or below the threshold Th1 (first threshold), the HARQ-IR mode (first transmission method) with a higher coding gain is selected and when the moving speed of the radio communication terminal is greater than the threshold Th1, the HARQ-CC mode (second transmission method) with a higher SINR improvement effect is selected. Therefore, when the fluctuation in channel quality at initial transmission and at retransmission is small, the coding gain can be more expected, whereas when the fluctuation in channel quality at initial transmission and at retransmission is greater, the SINR improvement effect can be more expected. As a result, it is possible to select an optimum transmission method in consideration of the fluctuation in channel quality at initial transmission and at retransmission, and thereby obtain a throughput improvement effect in the entire system.

Modification Example 1

Next, Modification Example 1 of the first embodiment of the present invention will be described mainly on differences from the first embodiment. In the radio communication system according to the first embodiment, the radio transmitting apparatus 10 selects the HARQ operating mode based on the moving speed of the radio communication terminal. The radio communication system according to Modification Example 1 is different from the first embodiment in that the radio receiving apparatus 20 selects the HARQ operating mode based on the moving speed of the radio communication terminal.

Figure 7:
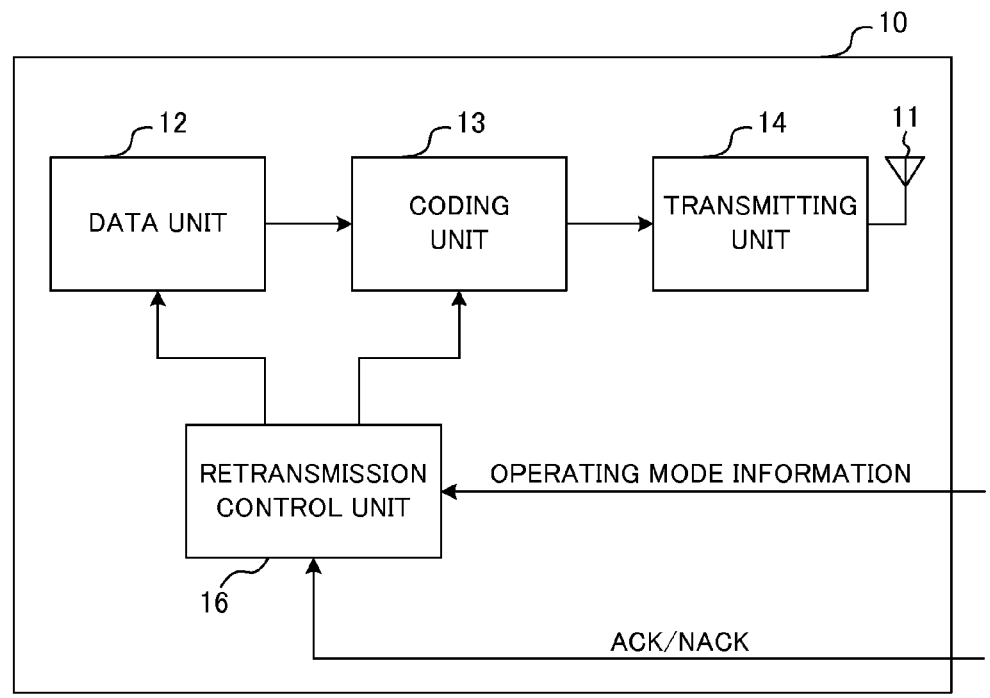
FIG. 7 is a functional configuration diagram of a radio transmitting apparatus according to Modification Example 1 of the present invention.

FIG. 7 is a functional configuration diagram of a radio transmitting apparatus according to Modification Example 1. As shown in FIG. 7, a radio transmitting apparatus 10 according to Modification Example 1 is not provided with the moving speed acquiring unit 15 unlike the radio transmitting apparatus 10 (see FIG. 3) according to the first embodiment.

The retransmission control unit 16 performs packet retransmission control based on an acknowledgment signal (ACK/NACK) notified from the radio receiving apparatus 20 and operating mode information notified from the radio receiving apparatus 20. Here, the operating mode information indicates the selection result of the HARQ operating mode based on the moving speed of the radio communication terminal.

To be more specific, the retransmission control unit 16 notifies the necessity or no necessity of packet retransmission to the data unit 12 according to the acknowledgment signal (ACK/NACK) notified from the radio receiving apparatus 20. Furthermore, the retransmission control unit 16 notifies the HARQ operating mode selected by the radio receiving apparatus 20 to the coding unit 13 according to the operating mode information notified from the radio receiving apparatus 20.

Figure 8:
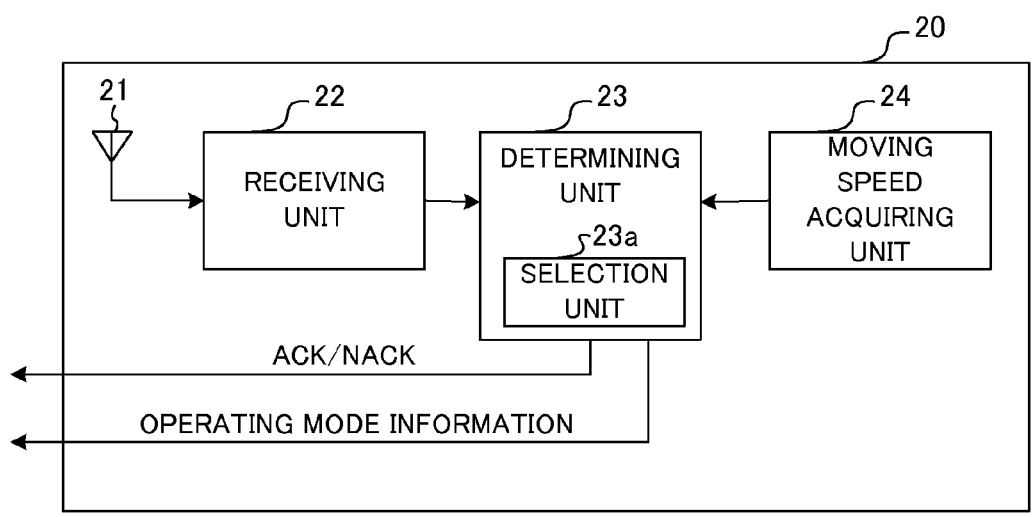
FIG. 8 is a functional configuration diagram of a radio receiving apparatus according to Modification Example 1 of the present invention.

FIG. 8 is a functional configuration diagram of a radio receiving apparatus according to Modification Example 1. As shown in FIG. 8, a radio receiving apparatus 20 according to Modification Example 1 is provided with a moving speed acquiring unit 24 unlike the radio receiving apparatus 20 (see FIG. 5) according to the first embodiment.

The moving speed acquiring unit 24 acquires the moving speed of the radio communication terminal and notifies the moving speed to a determining unit 23. To be more specific, the moving speed acquiring unit 24 acquires the moving speed of the radio communication terminal which is the radio receiving apparatus 20 at a predetermined time interval in a downlink and acquires the moving speed of the radio communication terminal which is the radio transmitting apparatus 10 at a predetermined time interval in an uplink. Here, as described above, the predetermined time interval is, for example, the moving speed acquiring interval Tb in FIG. 4. Furthermore, the moving speed acquiring unit 24 may calculate the moving speed according to position information periodically measured by the GPS function of the radio receiving apparatus 20 (radio communication terminal) in a downlink. Furthermore, the moving speed acquiring unit 24 may acquire the moving speed calculated by the radio transmitting apparatus 10 (radio communication terminal) in an uplink or the moving speed may be calculated using the position information acquired from the radio transmitting apparatus 10 (radio communication terminal).

The determining unit 23 includes a selection unit 23a. The selection unit 23a selects a HARQ operating mode based on the moving speed of the radio communication terminal notified from the moving speed acquiring unit 24. The selection unit 23a notifies the selected HARQ operating mode to the radio transmitting apparatus 10 as operating mode information.

In the radio communication system according to Modification Example 1, the operation of the selection unit 23a of the radio receiving apparatus 20 selecting the HARQ operating mode is similar to the operation shown in FIG. 6, and therefore descriptions thereof will be omitted.

Second Embodiment

Next, a second embodiment of the present invention will be described mainly on the differences from the first embodiment. In the radio communication system according to the first embodiment, the radio transmitting apparatus 10 selects the HARQ operating mode based on the moving speed of the radio communication terminal. The radio communication system according to the second embodiment is different from the first embodiment in that the radio transmitting apparatus 10 selects the HARQ operating mode based on channel quality fluctuation information in addition to the moving speed of the radio communication terminal.

Figure 9:
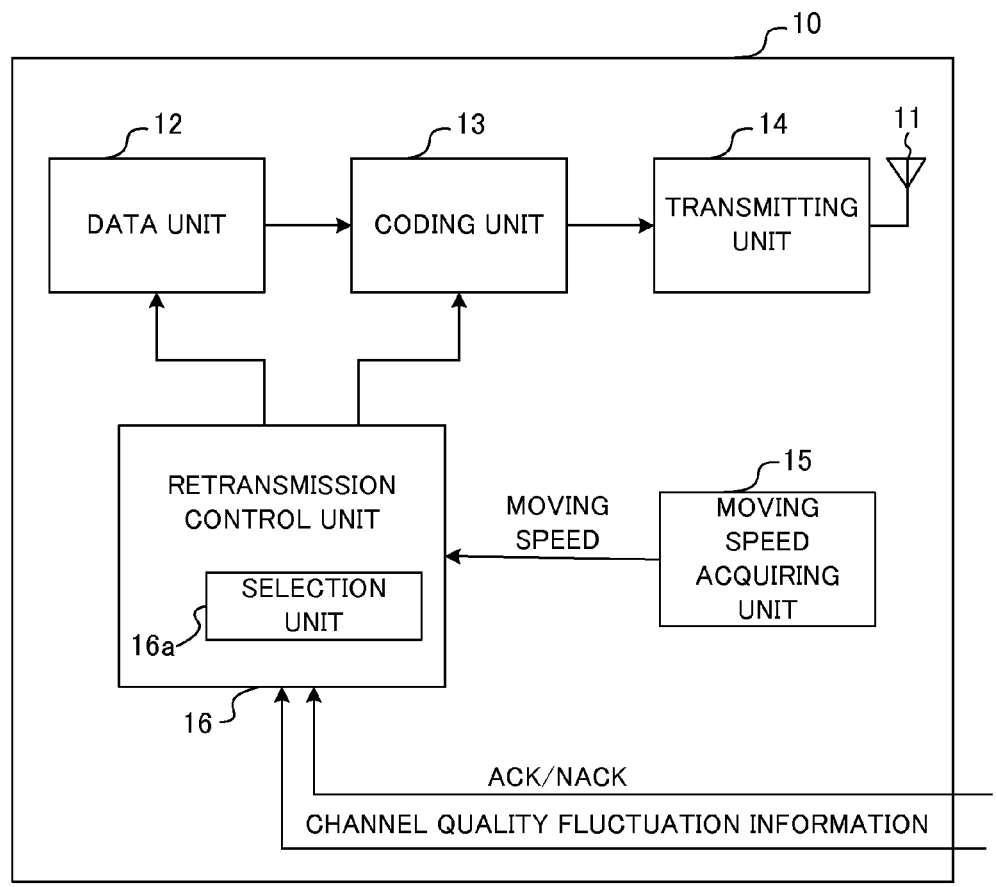
FIG. 9 is a functional configuration diagram of a radio transmitting apparatus according to a second embodiment of the present invention.

FIG. 9 is a functional configuration diagram of a radio transmitting apparatus according to the second embodiment. As shown in FIG. 9, the selection unit 16a of the radio transmitting apparatus 10 according to the second embodiment selects the HARQ operating mode based on channel quality fluctuation information (which will be described later) notified from the radio receiving apparatus 20 in addition to the moving speed of the radio communication terminal notified from the moving speed acquiring unit 15. To be more specific, when the moving speed acquired by the moving speed acquiring unit 15 is equal to or below the threshold Th1, the selection unit 16a selects the HARQ-IR mode. On the other hand, when the moving speed acquired by the moving speed acquiring unit 15 is greater than the threshold Th1 and the fluctuation value of channel quality indicated by channel quality fluctuation information is equal to or below a threshold Th2, the selection unit 16a selects the HARQ-IR mode. Furthermore, when the moving speed acquired by the moving speed acquiring unit 15 is greater than the threshold Th1 and the fluctuation value of channel quality indicated by the channel quality fluctuation information is greater than the threshold Th2, the selection unit 16a selects the HARQ-CC mode.

Here, the threshold Th2 is determined according to an MCS (Modulation and Coding Scheme) mode applied at a packet retransmission interval Ta. To be more specific, the threshold Th2 increases as an M-ary modulation value in M-ary modulation processing or the coding rate in channel coding processing increases.

Figure 10:
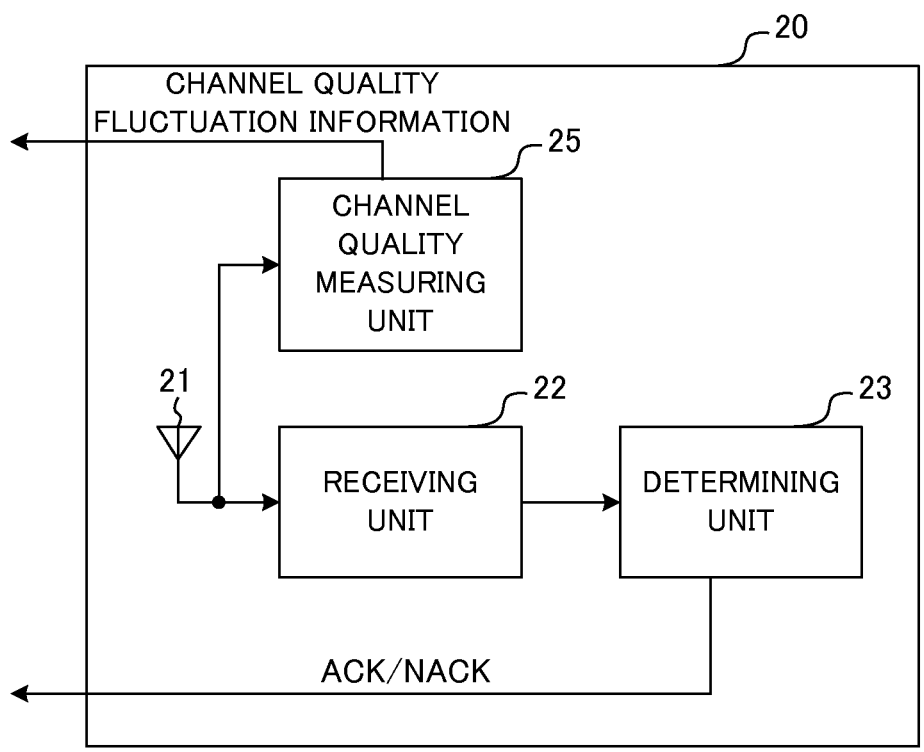
FIG. 10 is a functional configuration diagram of a radio receiving apparatus according to the second embodiment of the present invention.

FIG. 10 is a functional configuration diagram of a radio receiving apparatus according to the second embodiment. As shown in FIG. 10, unlike the radio receiving apparatus 20 (see FIG. 5) according to the first embodiment, the radio receiving apparatus 20 according to the second embodiment is provided with a channel quality measuring unit 25.

The channel quality measuring unit 25 measures channel quality between the radio transmitting apparatus 10 and the radio receiving apparatus 20 at a retransmission interval Ta. Furthermore, the channel quality measuring unit 25 calculates channel quality fluctuation information based on the channel quality measured at the retransmission interval Ta.

Here, the "channel quality measured at the retransmission interval Ta" is measured according to, for example, an SINR or the like of a signal transmitted from the radio transmitting apparatus 10. Furthermore, the "channel quality fluctuation information" is information indicating a fluctuation value of channel quality measured at the retransmission interval Ta. The quality measuring unit 25 calculates the fluctuation value of channel quality using, for example, the following method.

(1) A method of calculating a fluctuation value of channel quality according to a difference between the receiving quality of a signal measured at timing at which scheduling for previous transmission (e.g., time T1 in FIG. 4) is performed and the receiving quality of a signal measured at timing at which scheduling for this transmission (e.g., time T2 in FIG. 4) is performed.

(2) A method of calculating a fluctuation value of channel quality according to a difference between the receiving quality of a signal (e.g., pilot channel) measured at timing of previous transmission (e.g., time T1 in FIG. 4) and the receiving quality at timing of this transmission (e.g., time T2 in FIG. 4) predicted using, for example, an auto regressive moving average (ARMA: AutoRegressive Moving Average) model.

The channel quality measuring unit 25 notifies channel quality fluctuation information indicating the fluctuation value of channel quality calculated as shown above to the radio transmitting apparatus 10 at a retransmission interval Ta.

Figure 11:
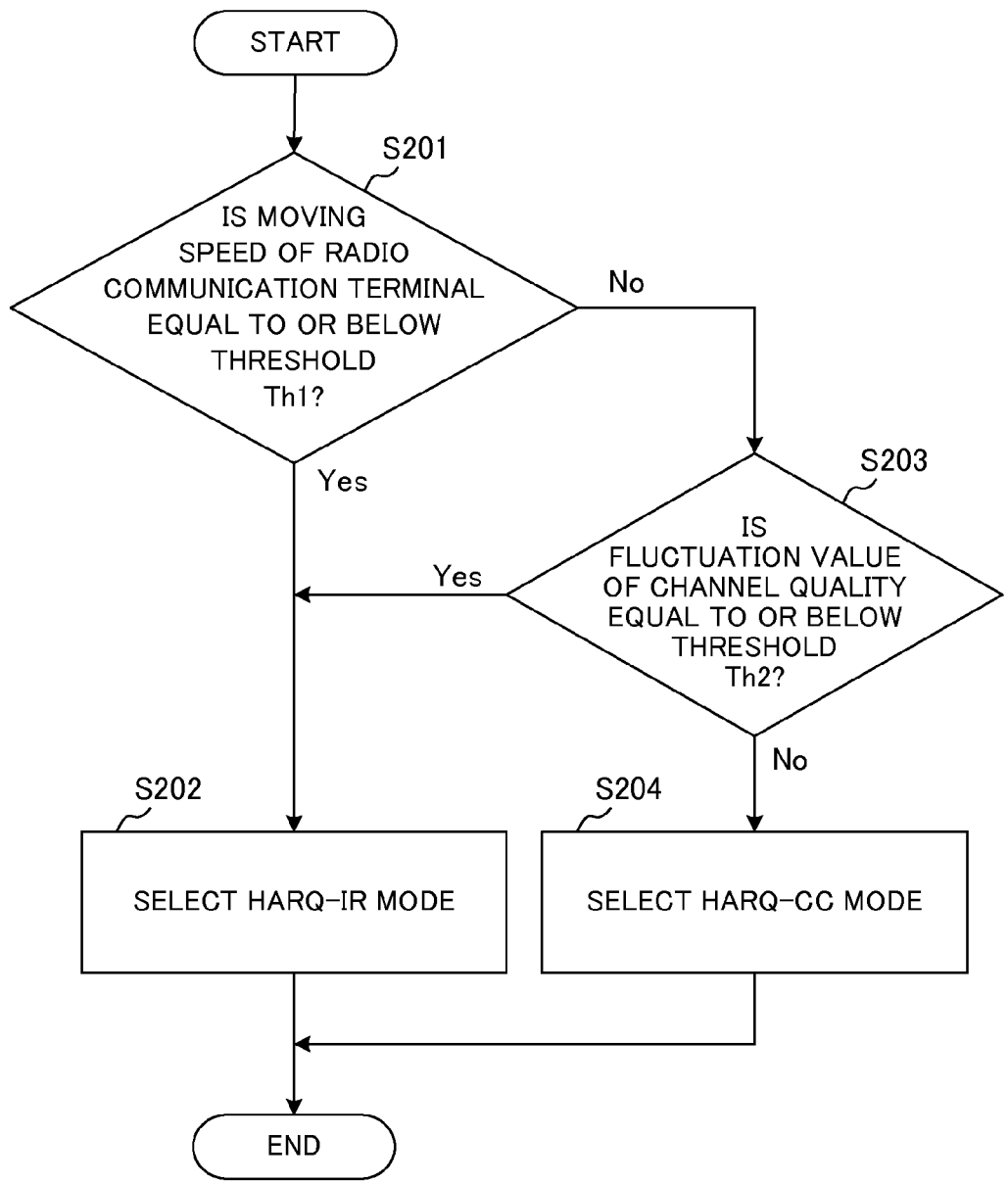
FIG. 11 is a flowchart illustrating operation of the radio communication system according to the second embodiment of the present invention.

Next, in the radio communication system configured as shown above, the operation of the radio transmitting apparatus 10 selecting the HARQ operating mode will be described. FIG. 11 is a flowchart illustrating a selection operation of the HARQ operating mode according to the second embodiment.

Suppose this operation is started every time the moving speed of the radio communication terminal is acquired, that is, at the moving speed acquiring interval Tb shown in FIG. 4. Furthermore, suppose this operation in the second embodiment is also started by the selection unit 16a even when the fluctuation value of channel quality notified from the radio receiving apparatus 20 at the retransmission interval Ta is not proportional to the moving speed of the radio communication terminal acquired by the moving speed acquiring unit 15. To be more specific, the selection unit 16a estimates the moving speed of the radio communication terminal at the retransmission interval Ta, according to Doppler frequency information derived based on the fluctuation value of channel quality notified from the radio receiving apparatus 20. When the difference between the moving speed of the radio communication terminal estimated at the retransmission interval Ta and the moving speed of the radio communication terminal acquired at the moving speed acquiring interval Tb by the moving speed acquiring unit 15 is equal to or above a predetermined threshold, the selection unit 16a determines that the fluctuation value of channel quality is not proportional to the moving speed of the radio communication terminal and starts this operation.

Therefore, the HARQ operating mode is not changed at time T1 to Tn (applicable period Tc) in FIG. 4 according to the first embodiment, whereas according to the second embodiment, when the fluctuation value of channel quality notified from the radio receiving apparatus 20 at the retransmission interval Ta is not proportional to the moving speed of the radio communication terminal acquired in the moving speed acquiring unit 15, the HARQ operating mode can be changed by this operation even during a time (e.g., time T3) in the middle of time T1 to Tn (applicable period Tc) in FIG. 4.

The selection unit 16a determines whether or not the moving speed of the radio communication terminal is equal to or below a threshold Th1 (step S201).

When the moving speed of the radio communication terminal is equal to or below the threshold Th1 (step S201: Yes), the selection unit 16a selects the HARQ-IR mode (step S202). Here, when the moving speed of the radio communication terminal is equal to or below the threshold Th1, the fluctuation in channel quality at initial transmission and at retransmission becomes small as described in the first embodiment and the channel quality at initial transmission is estimated to become substantially equal to that at retransmission.

When, for example, in FIG. 4, the moving speed of the radio communication terminal at time T1 is equal to or below the threshold Th1, the channel quality at time T1 (at initial transmission) is estimated to become substantially equal to the channel quality at time T2 to Tn (at retransmission). In this case, the coding gain in the HARQ-IR mode can be more expected compared to the SINR improvement effect in the HARQ-CC mode. Therefore, when the moving speed of the radio communication terminal at time T1 is equal to or below the threshold Th1, the selection unit 16a selects the HARQ-IR mode as the HARQ operating mode.

On the other hand, when the moving speed of the radio communication terminal is greater than the threshold Th1 (step S201: No), the selection unit 16a determines whether or not the fluctuation value of channel quality indicated by the channel quality fluctuation information is equal to or below a threshold Th2 (step S203).

When the fluctuation value of channel quality is equal to or below the threshold Th2 (step S203: Yes), the selection unit 16a selects the HARQ-IR mode (step 202). Here, when the fluctuation value of channel quality notified from the radio receiving apparatus 20 is equal to or below the threshold Th2, there is little fluctuation in channel quality measured at the radio receiving apparatus 20 at the retransmission interval Ta and the channel quality measured at the retransmission interval Ta is estimated to become substantially equal.

Thus, when the fluctuation in channel quality is low even if the moving speed of the radio communication terminal is high (e.g., during high-speed movement in a line-of-sight environment), the coding gain in the HARQ-IR mode can be more expected compared to the SINR improvement effect in the HARQ-CC mode. Therefore, even when the moving speed of the radio communication terminal is greater than the threshold Th1, if the channel quality fluctuation information is equal to or below the threshold Th2, the selection unit 16a selects the HARQ-IR mode as the HARQ operating mode.

On the other hand, when the fluctuation value of channel quality is greater than the threshold Th2 (step S203: No), the selection unit 16a selects the HARQ-CC mode (step 204). Here, when the fluctuation value of channel quality notified from the radio receiving apparatus 20 is greater than the threshold Th2, the fluctuation in channel quality measured at the radio receiving apparatus 20 at the retransmission interval Ta is drastic and the channel quality measured at the retransmission interval Ta is estimated to drastically differ. Thus, when the fluctuation in channel quality at the retransmission interval Ta is drastic as estimated from the moving speed of the radio communication terminal, the HARQ-CC mode is preferably selected. Therefore, when the moving speed of the radio communication terminal is greater than the threshold Th1 and the fluctuation value of channel quality is greater than the threshold Th2, the selection unit 16a selects the HARQ-CC mode as the HARQ operating mode.

According to the radio communication system according to the second embodiment, the HARQ operating mode is selected based on the fluctuation value of channel quality measured at the retransmission interval Ta of several milliseconds in addition to the moving speed of the radio communication terminal acquired at the moving speed acquiring interval Tb of several seconds. Therefore, when the moving speed of the radio communication terminal is not proportional to the actual fluctuation value of channel quality at initial transmission and at retransmission (e.g., when the fluctuation value of channel quality is low even if the moving speed of the radio communication terminal is high as in the case of high-speed movement in a line-of-sight environment), it is possible to select an appropriate operating mode corresponding to the actual fluctuation value.

Furthermore, the radio communication system according to the second embodiment selects the HARQ-IR mode having a high coding gain, when the fluctuation value of channel quality is equal to or below the second threshold even if the moving speed of the radio communication terminal is greater than the first threshold. Therefore, when the moving speed of the radio communication terminal is not proportional to the actual fluctuation value of channel quality at initial transmission and at retransmission, an optimum operating mode in consideration of the actual fluctuation value can be selected, and therefore a throughput improvement effect in the entire system can be obtained.

Furthermore, when the fluctuation value of channel quality notified from the radio receiving apparatus 20 at the retransmission interval Ta is not proportional to the moving speed of the radio communication terminal acquired at the moving speed acquiring unit 15, the radio communication system according to the second embodiment starts the selection operation of the HARQ operating mode, regardless of the moving speed acquiring interval Tb of several seconds. Therefore, it is possible to select a more appropriate operating mode rather than performing selection operation at the moving speed acquiring interval Tb of several seconds, and to reduce a processing load on the radio transmitting apparatus 10 involved in the operating mode selection compared to when performing selection operation at the retransmission interval Ta of several milliseconds.

Modification Example 2

Next, Modification Example 2 of the second embodiment of the present invention will be described mainly on the differences from the second embodiment. In the radio communication system according to the second embodiment, the radio transmitting apparatus 10 selects the HARQ operating mode based on the moving speed of the radio communication terminal and the channel quality fluctuation information. The radio communication system according to Modification Example 2 is different from the first embodiment in that the radio receiving apparatus 20 selects the HARQ operating mode based on the moving speed of the radio communication terminal and the channel quality fluctuation information.

Figure 12:
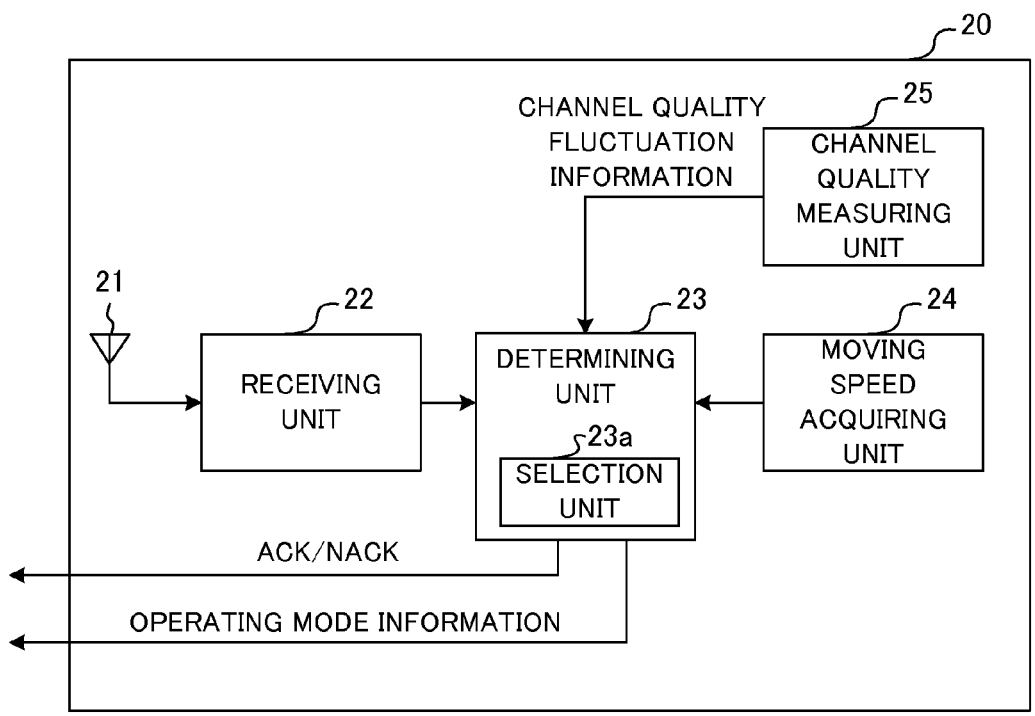
FIG. 12 is a functional configuration diagram of a radio receiving apparatus according to Modification Example 2 of the present invention.

FIG. 12 is a functional configuration diagram of a radio receiving apparatus according to Modification Example 2. As shown in FIG. 12, the radio receiving apparatus 20 according to Modification Example 2 is provided with a moving speed acquiring unit 24 unlike the radio receiving apparatus 20 (see FIG. 10) according to the second embodiment.

As in the case of the selection unit 16a according to the second embodiment, the selection unit 23a selects the HARQ operating mode based on the moving speed of the radio communication terminal and the channel quality fluctuation information calculated by the channel quality measuring unit 25. The selection unit 23a notifies the selected HARQ operating mode to the radio transmitting apparatus 10 as operating mode information.

The operation of the radio receiving apparatus 20 selecting the HARQ operating mode in the radio communication system according to Modification Example 2 is the same as the operation shown in FIG. 11, and therefore descriptions thereof will be omitted.

Other Embodiments

The present invention has been described according to the aforementioned embodiments, but statements, equations and drawings forming part of the present disclosure should by no means be understood as limitative to the present invention. With the present disclosure, various alternate embodiments, examples and operation techniques will become apparent to those skilled in the art.

For example, the above described embodiments have described that the moving speed of the radio communication terminal acquired by the moving speed acquiring unit 15 and moving speed acquiring unit 24 is calculated according to the position information periodically measured by the GPS function provided for the radio communication terminal. However, the present invention is not limited to this, but the moving speed of the radio communication terminal may also be calculated taking account of a position information measured using specific signals communicated with the radio base station or taking account of a Doppler frequency information or the like derived using channel quality information measured by the radio communication terminal.

The aforementioned second embodiment has described that the channel quality measuring unit 25 of the radio receiving apparatus 20 calculates a fluctuation value of channel quality based on channel quality measured at the retransmission interval Ta and notifies the calculated fluctuation value of channel quality to the radio transmitting apparatus 10. However, the present invention is not limited to this, but the channel quality measuring unit 25 may notify the channel quality measured at the retransmission interval Ta to the radio transmitting apparatus 10 and the radio transmitting apparatus 10 may calculate the fluctuation value of channel quality using the above described method.

Furthermore, the aforementioned second embodiment has described that the channel quality measuring unit 25 of the radio receiving apparatus 20 notifies the fluctuation value of channel quality to the radio transmitting apparatus 10 at the retransmission interval Ta and when the fluctuation value of channel quality is not proportional to the moving speed of the radio communication terminal acquired by the moving speed acquiring unit 15, the selection unit 16a of the radio transmitting apparatus 10 performs the operation shown in FIG. 11 at an interval other than the moving speed acquiring interval Tb. However, the present invention is not limited to this, but when the fluctuation value of channel quality is not proportional to the moving speed of the radio communication terminal acquired by the moving speed acquiring unit 15, the channel quality measuring unit 25 of the radio receiving apparatus 20 may notify the fluctuation value of channel quality to the radio transmitting apparatus 10 at an interval other than the moving speed acquiring interval Tb regardless of the retransmission interval Ta. In such a case, when the fluctuation value of channel quality is notified from the radio receiving apparatus 20, the selection unit 16a of the radio transmitting apparatus 10 may also perform the operation shown in FIG. 11 at an interval other than the moving speed acquiring interval Tb.

What is claimed is:

1. A radio communication system in which a radio transmitting apparatus transmits a packet to a radio receiving apparatus using a hybrid automatic repeat request (HARQ) scheme, comprising:

a moving speed acquiring unit configured to acquire a moving speed of a radio communication terminal which is the radio transmitting apparatus or the radio receiving apparatus;

a selection unit configured to select a first transmission method that transmits a packet including an information bit at initial transmission and transmits a packet including an error correction bit without including the information bit at retransmission or a second transmission method that transmits a packet including a same information bit and a same error correction bit at both initial transmission and retransmission based on the moving speed acquired by the moving speed acquiring unit;

a transmitting unit configured to perform initial transmission and retransmission of the packet according to the first transmission method or the second transmission method selected by the selection unit; and a channel quality measuring unit configured to measure channel quality between the radio transmitting apparatus and the radio receiving apparatus at a retransmission interval which is a time interval with which the packet is retransmitted, wherein the moving speed acquiring unit is configured to acquire the moving speed at a time interval longer than the retransmission interval, and the selection unit is configured to select the first transmission method or the second transmission method based on a fluctuation value of the channel quality measured by the channel quality measuring unit in addition to the moving speed acquired by the moving speed acquiring unit, wherein when the moving speed acquired by the moving speed acquiring unit is equal to or below a first threshold, the selection unit is configured to select the first transmission method, whereas when the moving speed acquired by the moving speed acquiring unit is greater than the first threshold and the fluctuation value of channel quality is equal to or below a second threshold, the selection unit is configured to select the first transmission method, and when the moving speed acquired by the moving speed acquiring unit is greater than the first threshold and the fluctuation value of the channel quality is greater than the second threshold, the selection unit is configured to select the second transmission method.

2. A radio transmitting apparatus that transmits a packet to a radio receiving apparatus using a hybrid automatic repeat request (HARQ) scheme, comprising:

a moving speed acquiring unit configured to acquire a moving speed of a radio communication terminal which is the radio transmitting apparatus or the radio receiving apparatus;

a selection unit configured to select a first transmission method that transmits a packet including an information bit at initial transmission and transmits a packet including an error correction bit without including the information bit at retransmission or a second transmission method that transmits a packet including a same information bit and a same error correction bit at both initial transmission and retransmission based on the moving speed acquired by the moving speed acquiring unit;

a transmitting unit configured to perform initial transmission and retransmission of the packet according to the first transmission method or the second transmission method selected by the selection unit and a channel quality measuring unit configured to measure channel quality between the radio transmitting apparatus and the radio receiving apparatus at a retransmission interval which is a time interval with which the packet is retransmitted, wherein the moving speed acquiring unit is configured to acquire the moving speed at a time interval longer than the retransmission interval, and the selection unit is configured to select the first transmission method or the second transmission method based on a fluctuation value of the channel quality measured by the channel quality measuring unit in addition to the moving speed acquired by the moving speed acquiring unit, wherein when the moving speed acquired by the moving speed acquiring unit is equal to or below a first threshold, the selection unit is configured to select the first transmission method, whereas when the moving speed acquired by the moving speed acquiring unit is greater than the first threshold and the fluctuation value of channel quality is equal to or below a second threshold, the selection unit is configured to select the first transmission method, and when the moving speed acquired by the moving speed acquiring unit is greater than the first threshold and the fluctuation value of the channel quality is greater than the second threshold, the selection unit is configured to select the second transmission method.

3. A radio receiving apparatus that receives a packet transmitted from a radio transmitting apparatus using a hybrid automatic repeat request (HARQ) scheme, comprising:

a moving speed acquiring unit configured to acquire a moving speed of a radio communication terminal which is the radio transmitting apparatus or the radio receiving apparatus;

a selection unit configured to select a first transmission method that transmits a packet including an information bit at initial transmission and transmits a packet including an error correction bit without including the information bit at retransmission or a second transmission method that transmits a packet including a same information bit and a same error correction bit at both initial transmission and retransmission based on the moving speed acquired by the moving speed acquiring unit;

a notification unit configured to notify the first transmission method or the second transmission method selected by the selection unit to the radio transmitting apparatus; and a channel quality measuring unit configured to measure channel quality between the radio transmitting apparatus and the radio receiving apparatus at a retransmission interval which is a time interval with which the packet is retransmitted, wherein the moving speed acquiring unit is configured to acquire the moving speed at a time interval longer than the retransmission interval, and the selection unit is configured to select the first transmission method or the second transmission method based on a fluctuation value of the channel quality measured by the channel quality measuring unit in addition to the moving speed acquired by the moving speed acquiring unit, wherein when the moving speed acquired by the moving speed acquiring unit is equal to or below a first threshold, the selection unit is configured to select the first transmission method, whereas when the moving speed acquired by the moving speed acquiring unit is greater than the first threshold and the fluctuation value of channel quality is equal to or below a second threshold, the selection unit is configured to select the first transmission method, and when the moving speed acquired by the moving speed acquiring unit is greater than the first threshold and the fluctuation value of the channel quality is greater than the second threshold, the selection unit is configured to select the second transmission method.

* * * * *